(No Model.)

J. R. LITTLE.
METHOD OF MAKING METAL WHEELS.

No. 471,008. Patented Mar. 15, 1892.

Witnesses:
Jas. E. Hutchinson.
Henry C. Hazard.

Inventor:
James R. Little, by
Arundel and Russell, his Attys

UNITED STATES PATENT OFFICE.

JAMES R. LITTLE, OF QUINCY, ILLINOIS.

METHOD OF MAKING METAL WHEELS.

SPECIFICATION forming part of Letters Patent No. 471,008, dated March 15, 1892.

Application filed June 16, 1891. Serial No. 396,512. (No model.)

*To all whom it may concern:*

Be it known that I, JAMES R. LITTLE, of Quincy, in the county of Adams, and in the State of Illinois, have invented certain new and useful Improvements in Methods of Making Metal Wheels; and I do hereby declare that the following is a full, clear, and exact description thereof, reference being had to the accompanying drawings, in which—

Figure 1:
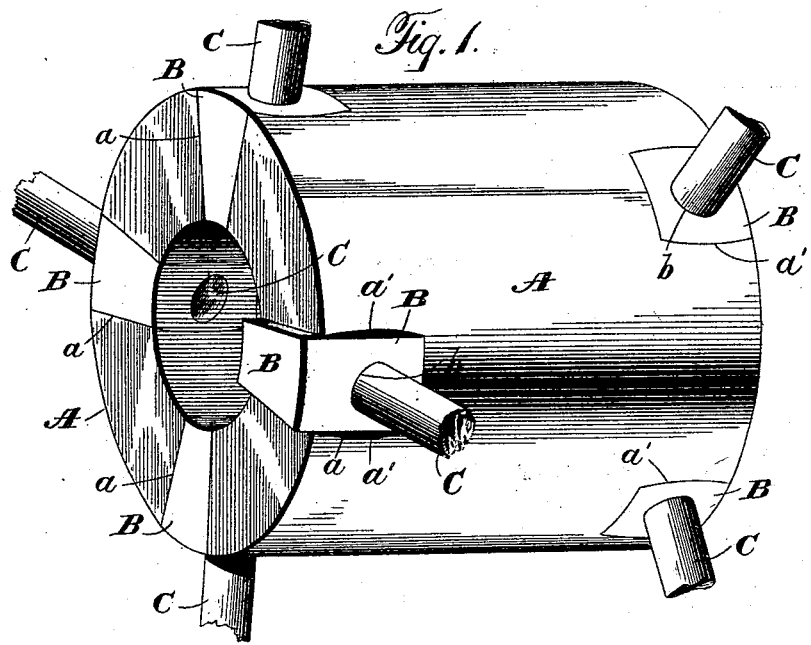
Figure 2:
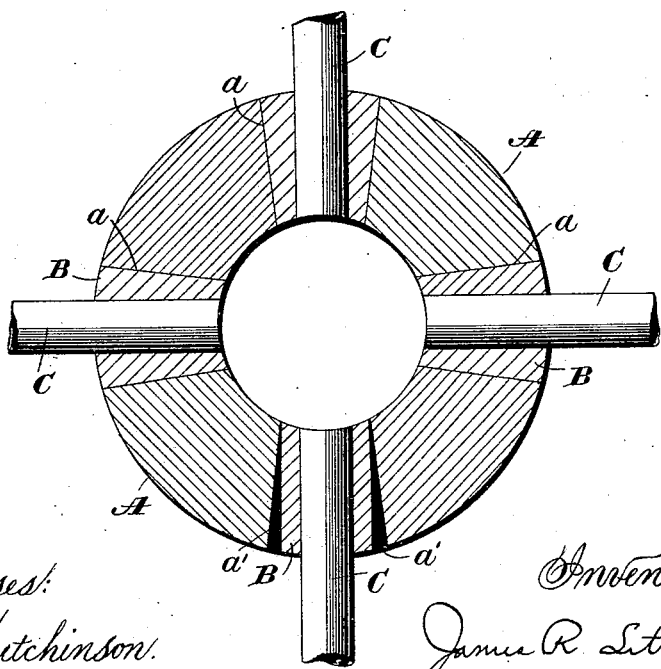

Figure 1 is a perspective view of a hub and spokes united therewith in accordance with my invention; and Fig. 2 is a longitudinal section on a line passing through the hub-axis, showing in the case of one spoke the relative shapes and positions of parts before the union of the spoke is accomplished.

Letters of like name and kind refer to like parts in both the figures.

The design of my invention is to construct a metal wheel whose hub and spokes shall be most strongly and rigidly united; and to this end said invention consists in the method employed, substantially as and for the purpose hereinafter specified.

My invention, broadly considered, involves the idea of uniting a hub and spokes by the compression upon the latter of the inclosing portion of the hub, as set forth in my application, Serial No. 393,207, filed May 18, 1891. In the said application, as illustrating the method which constitutes its subject-matter, I describe a hub composed entirely of malleable iron provided with openings or mortises for the reception of spokes, which are secured to the hub by compressing the inclosing metal upon them. The present invention, however, has in view the union of spokes with a cast-iron hub, in the manner above indicated; and this I accomplish by the method now to be described.

Referring to the drawings, A designates a cast-iron hub having formed in each end a series of radial recesses or cavities $a$, larger than the diameter of a spoke end. Said recesses may have the shape shown or any other desired shape in plan view; but whatever their general shape may be they should, between their inner and outer ends, be widened or increased in size in a circumferential direction. This latter in the present instance is done by making the two opposite radial walls $a'$ and $a'$ concave or swelled outwardly. To the hub thus constructed I attach the spokes in the following manner, viz: In each recess or cavity $a$ I place a plane or approximately plane sided block B, of malleable iron, whose dimensions are such, with reference to the shape and size of the cavity, as to enable it to be readily put therein, and when so situated to project a short distance beyond the end face of the hub. Then with a spoke C placed in a longitudinal opening $b$ in the block said block, by any suitable means, is subjected on the projecting portion to such pressure in a line parallel with the direction of the hub-axis as will compress it in such direction and cause it to expand laterally to fill and tightly fit said cavity and at the same time be compressed around and upon the contained portion of the spoke C and form therewith a tight and secure joint possessing all needful strength and rigidity. The increase or widening of the recesses or cavities, as above described, accommodates or provides room for the blocks as they expand laterally in consequence of their compression, and insures the secure retention of said blocks in the cavities when expanded therein.

The wheel-rim may be attached to the spokes in any desired way.

I intend that wheels having their hubs and spokes united by the method herein set forth shall be used especially as pulleys for power-transmitting purposes; but of course my invention is not limited to the manufacture of wheels for such special use, because wheels thus made may be used for other purposes.

Having thus described my invention, what I claim is—

1. As an improvement in the manufacture of wheels, the method of uniting a metal hub and spoke, which consists in subjecting a spoke-inclosing block placed in an opening or recess in the hub to such pressure as will expand it to fill and tightly fit said recess and compress it upon the inclosed spoke, substantially as and for the purpose specified.

2. As an improvement in the manufacture of wheels, the method of uniting a cast-metal hub and a metal spoke, which consists in subjecting a malleable spoke-inclosing block placed in an internally-enlarged opening or recess in the hub to such pressure as will expand it to fill and tightly fit said recess and compress it upon the inclosed spoke, substantially as and for the purpose shown.

In testimony that I claim the foregoing I have hereunto set my hand this 26th day of May, 1891.

JAMES R. LITTLE.

Witnesses:
S. M. WALLACE,
S. DEIDESHEIMER.